United States Patent [19]

Friedel, Jr. et al.

[11] 4,118,311
[45] Oct. 3, 1978

[54] TOMATO HARVESTING SORTING SYSTEM

[75] Inventors: William C. Friedel, Jr., Los Banos; Charles F. Dietz, Rio Vista, both of Calif.

[73] Assignee: The Regents of the University of California, Berkeley, Calif.

[21] Appl. No.: 733,157

[22] Filed: Oct. 18, 1976

[51] Int. Cl.² .................. B07C 5/12; A01D 46/00
[52] U.S. Cl. .................................. 209/75; 130/30 R; 209/580
[58] Field of Search ............... 209/75, 111.6, 125; 130/30 R

[56] References Cited

U.S. PATENT DOCUMENTS

| | | | |
|---|---|---|---|
| 3,331,198 | 7/1967 | Hill et al. | 130/30 R X |
| 3,390,768 | 7/1968 | Button | 130/30 R X |
| 3,435,950 | 4/1969 | Suverkrop | 209/75 X |
| 3,473,613 | 10/1969 | Boyce | 130/30 R X |
| 3,581,888 | 6/1971 | Kelly | 209/75 X |
| 3,886,951 | 6/1975 | McRobert | 130/30 R |
| 3,916,913 | 11/1975 | Looken et al. | 130/30 R |

Primary Examiner—Robert B. Reeves
Assistant Examiner—David A. Scherbel
Attorney, Agent, or Firm—Owen, Wickersham & Erickson

[57] ABSTRACT

A tomato harvester sorting system. Tomatoes from a rear cross-conveyor are caried forwardly by a pre-sorting conveyor where workers remove vegetative trash. An electro-mechanical sorter judges the redness or greenness of tomatoes falling from the forward end of the pre-sorting conveyor and impels green tomatoes into a cull chute, while red tomatoes fall on to an elevating conveyor. An after-sorting conveyor receives red tomatoes from the upper end of the elevating conveyor and carries them forward to an output end, while workers remove blemished and overripe fruit. A tiltable, outwardly-moving clod conveyor, being the terminal portion of a conveyor system for clods and loose tomatoes, has a cull chute at its outer end. The clod conveyor is positioned directly over the elevating conveyor. A worker removes good tomatoes from the clod conveyor and places them in the main sorting stream with the red tomatoes.

9 Claims, 4 Drawing Figures

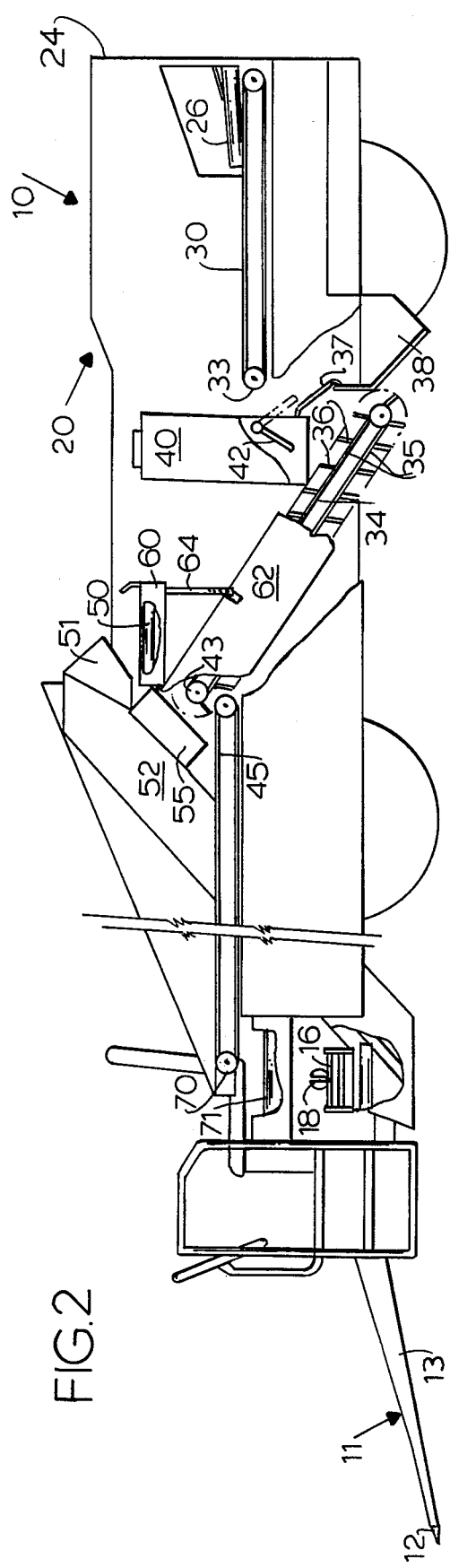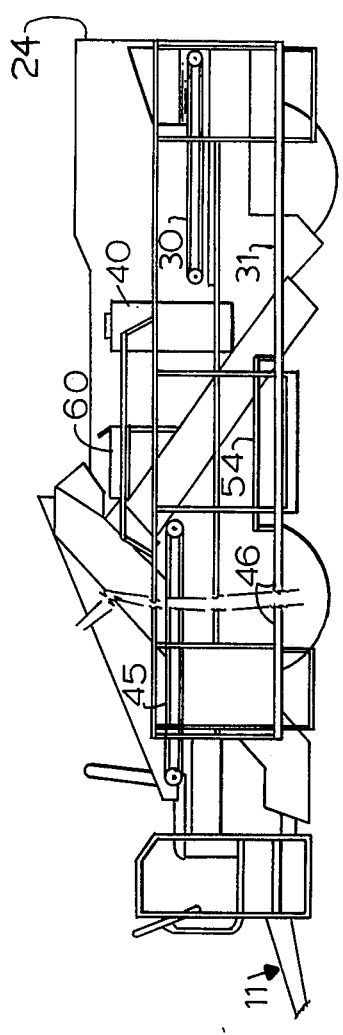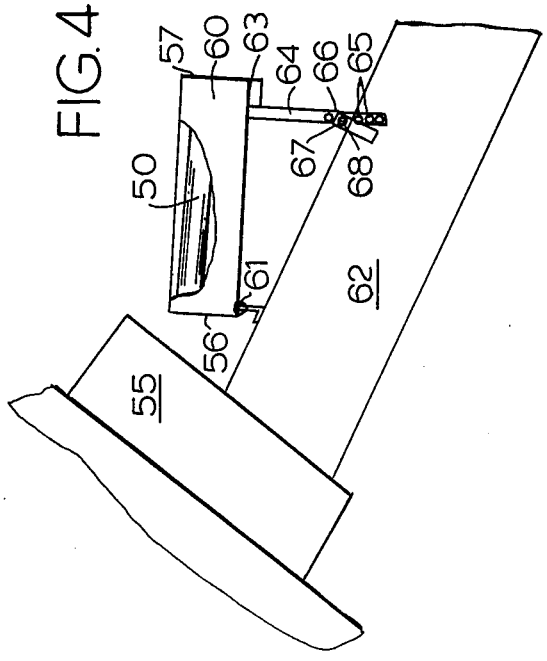

TOMATO HARVESTING SORTING SYSTEM

BACKGROUND OF THE INVENTION

This invention relates to a tomato harvester sorting system.

Originally, mechanically harvested tomatoes were hand sorted. After the vines had been severed near their roots, the vines elevated and shaken, and the tomatoes detached from them, the vines were disposed of, and the tomatoes were collected and conveyed on one or more horizontal sorting belts past a long line of workers, typically a dozen or more at each sorting belt, each of whom would do his best to remove culls. In systems in which loose tomatoes were picked up along with dirt and clods, the loose dirt was separated from the clods, and then, as in U.S. Pat. No. 3,986,561, the loose tomatoes and clods were elevated to a horizontal conveyor, from which one or more persons would remove good quality tomatoes and put them on the main sorting conveyor with the other good tomatoes.

Recently, electromechanical sorters have come into use. A typical such electromechanical sorter discriminates by skin color between green tomatoes and red ones and electronically actuates a mechanical system for ejecting gree tomatoes into a cull chute, while red ones pass on to the harvester output. While such electromechanical sorters work very well and have considerably sped up harvesting, they are not perfect. For example, they pass overripe red tomatoes instead of rejecting them. Moreover, when a large amount of green leaves or stems are mixed in with the tomatoes to be sorted, the green of the stems tends to cause the sorter fingers to move to a reject position so that red tomatoes entangled in or following very closely on the green leaves or stems may therefore be sent to the cull chute. Hence, it is desirable to get rid of stems and leaves, as much as feasible, before the tomatoes are electronically sorted.

Another problem that has arisen with electromechanical sorters is that, while they are very efficient, they sometimes do not remove all the green tomatoes, as when the quantity of tomatoes passing through the sorter is so large that the rejection device cannot reject all the green tomatoes guickly enough.

Another problem with machines having electromechanical sorters is, that if one is to combine them with hand sorting to remove green leaves and stems and overripe tomatoes, then a very compact arrangement has to be made if one is to avoid having to extend the length of the harvester frame. Extension of the frame is expensive, because it adds considerable weight and length; it is also undesirable because too long a frame has too long a turning radius. A great deal of money can be saved by having the sorting system compact, since the determining factor of the length of such tomato harvesters, at least of the efficient ones to which this invention is directed, is the length of the sorting system.

A factor affecting the length of the sorting system is the amount of space it takes to accommodate the clod conveyor and the person assigned to remove good tomatoes from the clod conveyor usually the clod conveyor has run rearwardly and has taken up a substantial amount of space.

The invention is directed to the solution of all these problems. It is also directed to a system which imparts additional efficiency to the hand sorting portion of the complete sorting process; it is intended to improve the combination of hand sorting withe electromechanical sorting.

Other objects and advantages of the invention will appear from the following description.

SUMMARY OF THE INVENTION

In the present invention, after the tomatoes have been attached from their vines and collected, they are conveyed in the normal manner by a pair of outwardly-moving, rear cross conveyors to a parallel pair of forwardly-moving, horizontal, pre-sorting conveyors, one on each side of the harvester. One or two persons are stationed on a platform next to the pre-sorting conveyor, and their job is to remove all remaining green leaves, vines, or other vegetative trash. As the tomatoes fall off the forward end of the relatively short pre-sorting conveyor, or just after of just before they fall, they are scanned by a color-sensitive device which is able to distinguish between red tomatoes, which are accepted, and green tomatoes an clods of dirt, which are rejected. This device, which forms in itself no part of the present invention and yet is a feature of the combination as a whole, is made to actuate an electronic circuit each time the device senses a green tomato or dirt clod. There is a series of such circuits, each one of them localized for a short sector about the width of one tomato or slightly shorter. The actuated electronic circuit actuates a mechanically moved finger which acts quickly to divert each green tomato or dirt clod into a cull chute and which is then retracted to its normal position, so that red tomatoes can fall freely in a normal trajectory. At the bottom of their fall, the red tomatoes are collected on a moving elevator conveyor which has a series of flights and which raises the red tomatoes along an inclined path and deposits them of an after-sorting conveyor belt.

Directly past the electromechanical sorter and directly over the elevator conveyor is an additional conveyor which moves outwardly at a right angle to the paths of the pre-sorting and after-sorting conveyors. This outwardly-moving conveyor is the terminal portion of the clod conveyor system, and there is one on each side of the harvester. This conveyor terminates in a clod chute which discards to the ground all the material not removed therefrom. A person on a somewhat higher portion of the platform on which the hand sorters stand, removes from the outwardly-moving clod conveyor to either the elevator or the after-sorting conveyor, such tomatoes as he judges to be suitable to accompany the other ripe, firm, acceptable red tomatoes. A special feature of the present invention is that the outwardly-moving clod conveyor can be tilted to one side or another to cause many of the tomatoes to roll away from the clods, thereby making the job of transferring good tomatoes easier. The after-sorting conveyor to which the tomatoes arrive from the elevator or from the person standing at the outwardly-moving clod conveyor, is preferably a level, horizontal, forwardly-moving conveyor, very similar, except preferably longer, to the pre-sorting conveyor. The main purpose of the sorting workers her (there may be three or four) is to remove from the after-sorting conveyor overripe and defective tomatoes. They may also remove any green tomatoes, if there are any, although with the current state of the electromechanical sorting art, not many green tomatoes get by the sorter.

At the forward end of the after-sorting conveyor, the tomatoes drop gently on to a front cross-conveyor which conveys them to an output boom, which in turn deposits them through a suitable transfer device into bins pulled by a truck which is moving along parallel to the harvester.

BRIEF DESCRIPTION OF THE DRAWINGS

In the drawings:

FIG. 2 is a view in side elevation of the tomato harvester of FIG. 1, with railings and platforms for workers removed and with some parts broken away to show others.

FIG. 3 is a view on a reduced scale similar to FIG. 2 but with railings and platforms shown.

FIG. 4 is a fragmentary view in side elevation of a portion of the outwardly-moving clod conveyor shown in FIGS. 1-3 and portions near to it.

DESCRIPTION OF A PREFERRED EMBODIMENT

Figure 1:
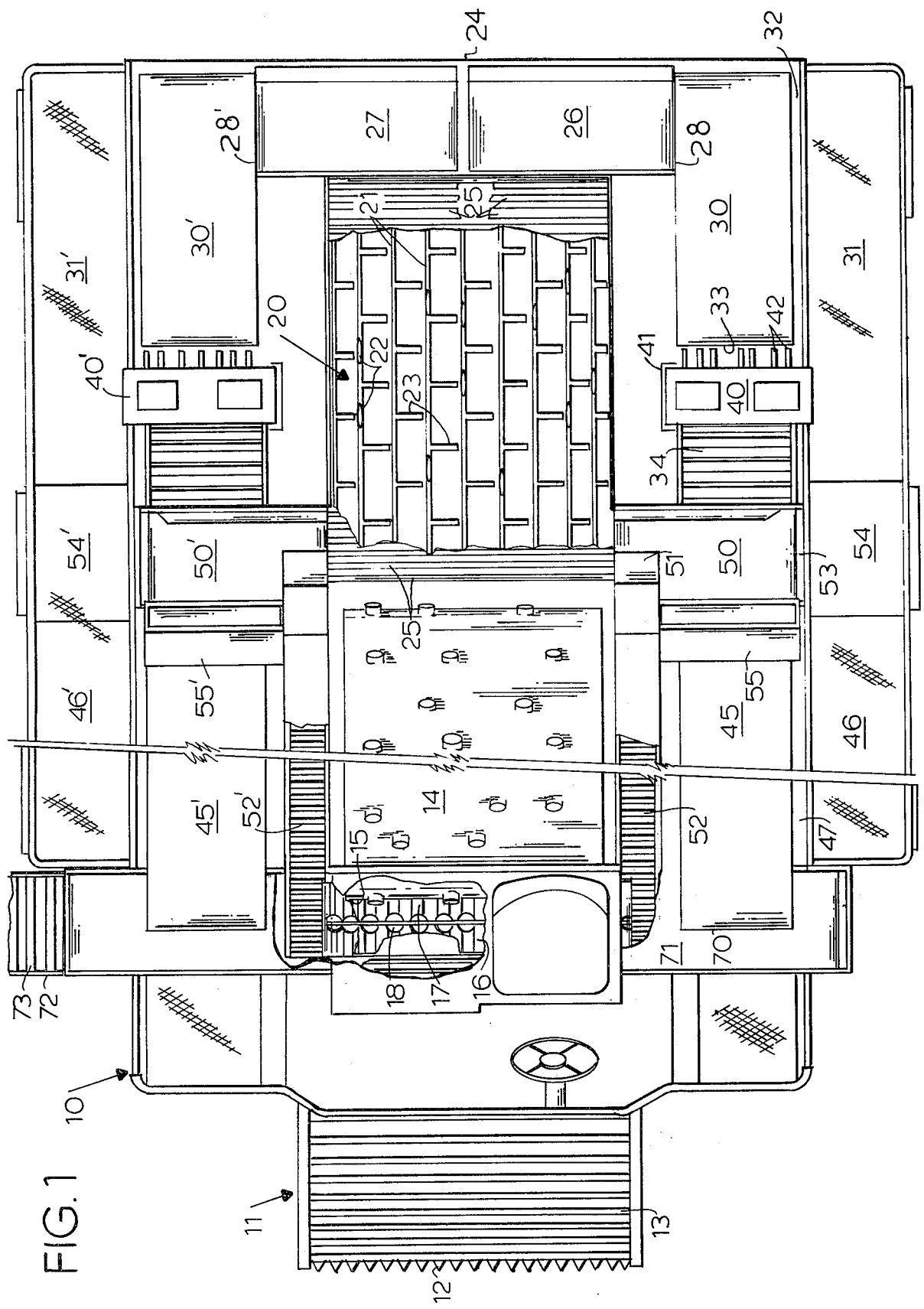
FIG. 1 is a top plan view of a tomato harvester embodying the principles of the invention. Some portions are broken away to show parts underneath.

A tomato harvester 10 embodying the invention incorporates a suitable tomato pickup device 11, which may include a severing knife 12, a spaced-bar type of elevator 13, through which loose dirt can pass, and a second and more sharply inclined solid-belt elevator 14. A gap 15 separates the two elevators 13 and 14, and clods and loose tomatoes fall through the gap 15 on to one of a pair of outwardly-moving clod cross-conveyors 16 and 17. A rotating spinner 18 like that in U.S. Pat. No. 3,986,561, may be positioned in this gap 15 for the purposes described in that patent.

From the top of the upper elevator 14, the tomato vines with attached tomatoes fall into a separator unit 20, which may comprise a series of walking bars 21 having suitable vertical fingers 22 and horizontal fingers 23. A pair of crankshafts (not shown) may move the walking bars 21 in the manner described in U.S. Pat. No. 3,252,464, in such a way as to shake the tomato vines and detach the tomatoes. The vines then are carried out over the rear end 24 and dumped, while the tomatoes fall down below and are collected on a collector conveyor 25. The collector conveyor 25 carries the tomatoes up to a pair of outwardly-moving rear cross-conveyors 26 and 27, which move them out to the two sides of the harvester 10.

Since the sorting systems along the two sides of the harvester 10 are identical or symmetrical only one of them will be described, and it will be understood that the other one is identical, though facing in the opposite direction. In FIG. 1 the corresponding sorting elements on both sides are numbered with the same reference numerals, except that a prime (') has been added to the numerals for the elements on the side not shown in FIGS. 2 and 3.

A pre-sorting conveyor 30 receives the tomatoes that drop from the outer end 28 of the outwardly-moving rear cross-conveyor 26 and moves them forward. Two workers can stand on a platform segment 31, so that they are in close proximity to the pre-sorting conveyor, and they remove principally the leaves and stems and other vegetative trash. If they desire, they may remove a few of the green tomatoes, but that is not their main job. They are provided with a waste chute 32 in which to drop the undersided vegetative matter.

The pre-sorting conveyor 30 moves at a carefully adjusted speed so that the tomatoes fall off the end 33 of the pre-sorting conveyor 30 and describe a relatively uniform trajectory. This uniform natural trajectory tends to carry them down toward an elevating conveyor 34. This elevating conveyor 34 has a moving member such as a belt 35 provided with flights 36, so that it is able to catch tomatoes and move them upwardly in an inclined path. Near the lower end of the elevator 34 and somewhat above it is a dividing barrier 37, which is used to divide a cull chute 38 from the normal free-flow path toward the belt 35.

An electromechanical sorter 40 of a commercially available type is mounted to a harvester frame portion 41 near the end 33 of the pre-sorting conveyor 30. This sorter 40 scans the tomatoes before, after, or as they drop off the end 33, and by their color determines whether they are to be accepted (red) or rejected (green and black), either not actuating or actuating mechanical fingers 42. When any finger 42 is actuated, it deflects a green tomato or dirt clod into the cull chute 38. The red tomatoes fall by their normal trajectory out the belt 35. As stated above, the speed of the conveyor 30 is carefully adjusted, by any desired means; this is done so that the sorter 40 will be acting on tomatoes that fall at substantially the same velocity and, if not deflected, describe substantially the same trajectory. Also, green tomatoes can thereby be deflected in a substantially uniform manner.

The elevating conveyor 34 carries the red tomatoes (which pass inspection by the electromechanical sorter 40) up to an upper end 43, where it deposits them on an after-sorting conveyor 45, which is preferably at the same height as the pre-sorting conveyor 30. A platform segment 46 is provided here to hold a series of (usually three or four) workers who remove from the after-sorting conveyor 45 blemished or overripe tomatoes and drop them into a cull chute 47. If any green tomatoes get to the after-sorting conveyor 45, they may remove those also.

Directly above the elevator 34 and directly past the electromechanical sorter 40 is an outwardly-moving clod conveyor 50. This conveyor 50 receives the material coming from an outlet chute 51 of a clod elevator 52; the clod elevator 52 receives its material from the end of one outwardly-moving clod cross-conveyor 16 and elevates it. The conveyor 52 thus receives clods and such loose tomatoes as are caught on the cross-conveyor 16, and conveys these clods and loose tomatoes to the conveyor 50. The outer end of the conveyor 50 empties the clods into a cull chute 53, which drops them to the ground. Just beyond the cull chute 53 is another platform segment 54, which is higher than the platform segments 31 and 46, and an operator stands on the platform segment 54 and removes good tomatoes from the outwardly-moving clod conveyor 50, preferably dropping them via a transfer slide or chute 55 on to the sorting conveyor 45. Alternatively, he may drop the good tomatoes on to the belt 35, depending on which hand he is using, though use of the chute 55 is preferred. Unsuitable tomatoes fall into the cull chute 53 with the clods.

In some instances, it is helpful for this outwardly-moving conveyor 50 to be level. In other instances, it is helpful if one side of the conveyor 50 is higher than the other. If the left side 56 is higher than the right side 57, then the tomatoes tend to roll toward the right (i.e., toward the rear of the harvester 10 in FIGS. 2-4), and if the right side 57 is higher than the left side 56 then the tomatoes tend to roll toward the left (i.e., toward the front of the harvester 10 in FIGS. 2-4). The clods, not being round, do not roll very well and therefore are more likely to stay put, so long as the inclination is not too steep. This separation of tomatoes from clods makes the sorting workers' job easier.

In order to achieve any desired inclination, depending on the harvesting conditions and operating practice, the conveyor 50 is supported by a frame 60 which is provided with a pair of hinges 61 on its forward side that is secured to a harvester frame portion 62. The conveyor frame 60 can be rotated about the hinges 61 over a reasonable number of degrees. The rear side 63 of the frame 60 has secured thereto a pair of supporting brackets 64 which have a plurality of openings 65 through them. Each of the brackets 64 is attached to the harvester frame portion 62 by inserting a bolt 66 through a suitable bracket opening 65 and into a suitable bolt opening 67 in the frame portion 62. Thus, when the bolts 66 are removed, the conveyor frame 60 can be adjusted to a desired inclination, either to the right or to the left, and then the openings 65 and 67 and the bolts 66 can be mated, and suitable nuts 68 screwed on the bolts 66, so that the conveyor frame 60 is then held in place with the conveyor 50 either level or tilted, as desired.

After the tomatoes have gone through the after-sorting step they fall off an end 70 of the after-sorting conveyor 45 on to a front cross-conveyor 71, which crosses the entire width of the tomato harvester 10 and routes all of the tomatoes to one side. There, a boom 72 is provided having a suitable conveyor 73 and having a suitable drop device (not shown) for depositing tomatoes. All these are described in earlier U.S. patents, including U.S. Pat. No. 3,348,647.

Thus, the tomatoes (after having been separated from the vines and collected) are first presorted to remove leaves and stems, are then mechanically sorted by an electronically controlled sorter 40 according to their color to send the green tomatoes into the cull chute 38 and the ripe tomatoes on to the elevating conveyor 34, which deposits them on the after-sorting conveyor 45. Clods and any loose tomatoes that go along with the clod are carried out by the conveyor 50 toward a sorter who may remove good tomatoes and place them with the other good tomatoes.

To those skilled in the art to which this inveniton relates, many changes in construction and widely differing embodiments and applications of the invention will suggest themselves without departing from the spirit and scope of the invention. The disclosures and the description herein are purely illustrative and are not intended to be in any sense limiting.

We claim:

1. A tomato harvester sorting system wherein tomatoes after detachment from the vines are collected and moved rearwardly to a rear cross-conveyor, said harvester also having means for separating dirt clods and loose tomatoes from the vines before said detachment and depositing the clods and loose tomatoes on a clod conveyor system, comprising:
   a horizontal forwardly-moving pre-sorting conveyor on which fall the tomatoes from said rear cross-conveyor, having an adjacent platform segment for workers to stand on and remove vegetative trash, the tomatoes falling off the forward end of said pre-sorting conveyor.
   an elevating forwardly-moving conveyor having a lower end for catching tomatoes falling from said pre-sorting conveyor and a flighted member for moving them to an upper end, from which the elevated tomatoes fall,
   cull disposal means to the rear of said elevating conveyor,
   a electromechanical sorter having means for judging the redness or greenness of tomatoes falling from said forward end of said pre-sorting conveyor and mechanical means for impelling green tomatoes into said cull disposal means while not interfering with the fall of red tomatoes into said elevating conveyor,
   an after-sorting conveyor receiving the red tomatoes falling from the upper end of said elevating conveyor and carrying them forward and generally horizontally to an output end and having an adjacent platform segment for workers to stand on to remove blemished and overripe fruit therefrom, and
   an outwardly-moving lateral clod-conveyor, being the terminal portion of said clod conveyor system, for carrying clods and loose tomatoes outwardly, having a cull chute at the outer end thereof into which the material on said clod conveyor falls, said clod conveyor being perpendicular to and positioned directly over said elevating conveyor and forward of said electromechanical sorter and having a platform segment adjacent its outer end for receiving a worker for removing good tomatoes from said clod conveyor for placing them in the main sorting stream with the red tomatoes.

2. The system of claim 1 wherein said clod conveyor has a frame and said harvester has a frame, and means for mounting said conveyor frame to said harvester frame so as to adjust the height of one side of said clod conveyor relative to the other side.

3. The system of claim 1 having an inclined chute with an upper end, located near the forward side of said clod conveyor and a lower end emptying onto said after-sorting conveyor, providing a path for flow of tomatoes removed by a worker from said clod conveyor.

4. A tomato harvester sorting system having a wheel-supported frame carrying all components thereof, wherein tomatoes, after severing of thier vines and late detachment from the vines, are collected and moved rearwardly to a rear cross-conveyor, said harvester also having means for separating dirt clods and loose tomatoes from the vines before said detachment and depositing them on a clod conveyor system, comprising:
   a horizontal forwardly-moving pre-sorting conveyor receiving tomatoes from said rear cross-conveyor, having an adjacent platform segment for workers to stand on and remove vegetative trash from said pre-sorting conveyor, the tomatoes falling off the forward end of said pre-sorting conveyor,
   a trash disposal chute in between said pre-sorting conveyor and its said platform segment,
   an elevating forwardly-moving conveyor having a lower end for catching tomatoes falling from said pre-sorting conveyor and a flighted belt for moving them to an upper end, from which the elevated tomatoes fall,
   a first cull chute to the rear of said elevating conveyor,
   a divider above said elevator and said first cull chute for separating tomatoes into a path leading to said elevating conveyor and a path leading to said cull chute, an electromechanical sorter having means for judging the redness or greeness of tomatoes falling from said forward end of said pre-sorting conveyor and mechanical means for impelling green tomatoes into said first cull chute while not interfering with the fall of red tomatoes into said elevating conveyor, an after-sorting conveyor receiving the red tomatoes falling from the upper end of said elevating conveyor and carrying them forward and generally horizontally to an output end and having an adjacent platform segment for workers to stand to remove blemished and overripe fruit therefrom, a second cull chute between said after-sorting conveyor and its platform segment, an outwardly-moving lateral clod conveyor, being the terminal portion of said clod conveyor system, for carrying clods and loose tomatoes outwardly toward the side of said harvester, having a third cull chute at the outer end thereof into which the material on said clod conveyor is conveyed, said clod conveyor being positioned directly over and perpendicular to said elevating conveyor and forward of said electromechanical sorter and having a platform segment adjacent its outer end for receiving a worker for removing good tomatoes from said clod conveyor, and an inclined transfer chute leading from the forward side of said clod conveyor to a locus above said after-sorting conveyor, for receiving good tomatoes removed from said clod conveyor by a worker and for depositing them on said after-sorting conveyor.

5. The system of claim 4 wherein said clod conveyor has a frame hinged at its rear side to said harvester frame, and having support bracket means secured to the forward side of said conveyor frame and having a series of opening means therethrough, a bolt-receiving means on said harvester frame, and bolt means for passing through selected opening means and to said bolt-receiving means for securing said clod conveyor either level from one side to the other or with one side higher than the other at a desired inclination, depending on which opening means the bolt means are passed through.

6. A tomato harvester sorting system wherein tomatoes after detachment from the vines are collected and moved rearwardly to a rear cross-conveyor, comprising:

a horizontal forwardly-moving pre-sorting conveyor on which fall the tomatoes from said rear cross-conveyor, having an adjacent platform segment for workers to stand on and remove vegetative trash, the tomatoes falling off the forward end of said pre-sorting conveyor, an elevating forwardly-moving conveyor having a lower end for catching tomatoes falling from said pre-sorting conveyor and a flighted elevator for moving them to an upper end, from which the elevated tomatoes fall, cull disposal means to the rear of said elevating conveyor, an electromechanical sorter having means for judging the redness or greeness of tomatoes falling from said forward end of said pre-sorting conveyor and mechanical means for impelling green tomatoes into said cull disposal means while not interfering with the fall of red tomatoes into said elevating conveyor, and an after-sorting conveyor receiving the red tomatoes falling from the upper end of said elevating conveyor and carrying them forward and generally horizontally to an output end and having an adjacent platform segment for workers to stand on to remove blemished and overripe fruit therefrom.

7. The tomato harvester of claim 6 having a trash disposal chute in between said pre-sorting conveyor and its said platform segment.

8. The tomato harvester of claim 6 wherein said cull disposal means comprises:

a cull chute to the rear of said elevating conveyor and a divider above said elevator and said cull chute for separating tomatoes into a path leading to said elevating conveyor and a path leading to said cull chute.

9. The tomato harvester of claim 6 having a cull chute between said after-sorting conveyor and its platform segment.

* * * * *